(12) United States Patent
Takaichi et al.

(10) Patent No.: US 7,310,602 B2
(45) Date of Patent: Dec. 18, 2007

(54) NAVIGATION APPARATUS

(75) Inventors: Toshio Takaichi, Tokyo (JP); Takashi Sugawara, Hokkaido (JP); Yasuo Ito, Hokkaido (JP); Jianwu Zeng, Tokyo (JP); Ryuya Muramatsu, Tokyo (JP)

(73) Assignee: Kabushiki Kaisha Equos Research (JP)

( * ) Notice: Subject to any disclaimer, the term of this patent is extended or adjusted under 35 U.S.C. 154(b) by 684 days.

(21) Appl. No.: 10/949,810

(22) Filed: Sep. 27, 2004

(65) Prior Publication Data
US 2006/0074661 A1 Apr. 6, 2006

(51) Int. Cl.
G10L 15/00 (2006.01)
G10L 15/04 (2006.01)

(52) U.S. Cl. .............. 704/252; 704/270; 704/275

(58) Field of Classification Search ............ 704/252, 704/270, 275
See application file for complete search history.

(56) References Cited

U.S. PATENT DOCUMENTS

| | | | | |
|---|---|---|---|---|
| 4,866,778 A * | 9/1989 | Baker | .......................... | 704/254 |
| 5,261,112 A * | 11/1993 | Futatsugi et al. | ............ | 715/533 |
| 5,737,723 A * | 4/1998 | Riley et al. | ................... | 704/243 |
| 5,909,667 A * | 6/1999 | Leontiades et al. | ......... | 704/275 |
| 6,418,410 B1 * | 7/2002 | Nassiff et al. | ............... | 704/251 |
| 6,611,802 B2 * | 8/2003 | Lewis et al. | ................. | 704/235 |
| 6,735,565 B2 * | 5/2004 | Gschwendtner | ............. | 704/254 |
| 7,149,970 B1 * | 12/2006 | Pratley et al. | ............... | 715/533 |
| 2002/0138265 A1 * | 9/2002 | Stevens et al. | ............. | 704/251 |
| 2005/0043949 A1 * | 2/2005 | Roth et al. | ................... | 704/251 |
| 2005/0192801 A1 * | 9/2005 | Lewis et al. | ................ | 704/240 |
| 2005/0203751 A1 * | 9/2005 | Stevens et al. | ............. | 704/276 |
| 2005/0228667 A1 * | 10/2005 | Duan et al. | ................. | 704/256 |

FOREIGN PATENT DOCUMENTS

JP 2003-316386 11/2003
JP 2003-330488 11/2003

* cited by examiner

*Primary Examiner*—David Hudspeth
*Assistant Examiner*—Eunice Ng
(74) *Attorney, Agent, or Firm*—Bacon & Thomas, PLLC

(57) ABSTRACT

In this navigation apparatus, when speech recognition of inputted speech is carried out, keywords included in the content of the recognized speech are searched from a dictionary DB, and then these words are displayed as keywords of a POI search. When a correction of a keyword is required by the user, because most errors occur in the first phonetic symbol of the misrecognized word, a search of words each having phonetic symbols in which the first phonetic symbol of the misrecognized word is changed from the phonetic symbols of the word to be corrected (i.e., a search of words having one different first phonetic symbol) is carried out to present candidates for correction. In this navigation apparatus, because the displayed candidates for correction are limited to words having a different first phonetic symbol which has a high possibility of being the cause of misrecognition, the user can correct the misrecognized keyword by a simple operation. Further, it is possible to reduce the process burden as compared to the conventional misrecognition correction processes.

4 Claims, 3 Drawing Sheets

NAVIGATION APPARATUS

BACKGROUND OF THE INVENTION

1. Field of the Invention

The present invention is related to a navigation apparatus, and in particular to a navigation apparatus which carries out a search of a geographical point based on speech recognition.

2. Description of the Prior Art

Navigation apparatuses which guide drivers by providing a travel route to a destination or a specific place such as a restaurant, a gas station or the like have become widespread.

In a navigation apparatus, when a destination is inputted or a geographical point of interest (POI: Point Of Interest) is specified, input from a display device is normally used. In addition, recently, input by speech recognition is also used in view of its simple operation and convenience during driving provided by a hands-free operation.

In such a navigation apparatus, due to the possibility of misrecognition in the case of speech input, the recognition result needs to be confirmed by speech output and/or image output.

Conventionally, in the case where there is misrecognition, a software keyboard on a touch panel or a remote control provided in a navigation apparatus is operated to correct the misrecognition.

Further, as described in Japanese Laid-Open Patent Application Publication No. 2003-316386 and Japanese Laid-Open Patent Application Publication No. 2003-330488, correction of misrecognition by speech has also been proposed.

However, in the method where a software keyboard on a touch panel or a remote control is operated, many operations must be repeatedly carried out for correcting misrecognition, and this is troublesome inside an environment such as an automobile. Further, this method loses the simple operation and the convenience by the hands-free operation that are the merits of speech recognition.

Further, in the case where misrecognition is corrected by speech as in the above-mentioned Japanese Laid-Open Patent Application Publications, the user operation is easy, but the burden at the apparatus side becomes large.

SUMMARY OF THE INVENTION

In view of the problems described above, it is an object of the present invention to provide a navigation apparatus which can correct misrecognition by a simple user operation without creating a large processing burden on the navigation apparatus.

In order to achieve the object, the present invention is directed to a navigation apparatus, which comprises:

storage means which stores keywords related to geographical points and their phonetic symbols;

speech recognition means for recognizing the content of speech;

word display means which displays words contained in the content of the recognized speech and matched with the keywords stored in the storage means;

search means for searching, in the case where correction is required for one of the displayed words, words each having phonetic symbols in which the first phonetic symbol thereof is different from the first phonetic symbol of the phonetic symbols of the word to be corrected;

candidates presenting means for presenting the searched words as candidates for correction;

result acquiring means for acquiring the word selected from the candidates for correction and words contained in the displayed words other than the selected word as a recognition result; and geographical point search means for carrying out a geographical point search based on the words of the recognition result.

According to the invention described above, when a correction of a word contained in the content of the speech recognized by the speech recognition means is required, words each having phonetic symbols in which the first phonetic symbol thereof is different from the first phonetic symbol of the phonetic symbols of the word to be corrected are presented for the user as candidates for correction, it is possible to reduce the burden for processing data in the navigation apparatus. Further, since there are many cases that the correct recognition result is included in words having the first phonetic symbol which is different from the first phonetic symbol of the misrecognized word, it is possible for the user to correct the misrecognized word with a reduced number of operations based on the displayed candidates for correction.

Further, in the present invention, it is preferred that the word displaying means converts the content of the speech into text data, extracts keywords from the text data that can be used for a POI search, and then displays words that are matched with the keywords.

Furthermore, in the present invention, it is preferred that the candidates presenting means displays the candidates for correction in alphabetical order.

Moreover, in the present invention, it is also preferred that the candidates presenting means displays the candidates for correction in the form of a list determined by considering the frequency or history of previous selections.

These and other objects, functions and results of the present invention will be apparent when the following description of the preferred embodiment will be considered take in conjunction with the attached drawings.

DETAILED DESCRIPTION OF THE PREFERRED EMBODIMENTS

The preferred embodiment of a navigation apparatus according to the present invention is described below with reference to FIG. 1 to FIG. 4.

1. Outline of the Embodiment

In the present embodiment, the intention of the user is taken into consideration by extracting effective words (that is, keywords) for a POI search from the content of a user's free speech, and then a search is carried out based on the keywords, the results of the search is sorted, and then the sorted results are displayed.

Further, the present invention makes it possible to correct misrecognition of speech recognition for a keyword by a simple user operation.

Many causes of misrecognition of speech recognition are due to acoustic factors. Therefore, in the conventional apparatuses, technology which carries out dynamic adjustment of the microphone input level or dynamic adjustment of the filter or the like is used to cope with a regularly changing acoustic environment.

However, when a user starts talking or resumes talking after a pause, the dynamic adjustment can not adequately follow the first sound. As a result, there are many instances where misrecognition is caused by only the first emitted sound being different.

The present embodiment is designed to correct misrecognition from such viewpoint.

Specifically, speech recognition of inputted speech is carried out, keywords included in the content of the recognized speech are searched from a dictionary DB, and then these words are displayed as keywords of a POI search.

When a correction of a keyword is required by the user, because most errors occur in the first phonetic symbol of the misrecognized word, a search of words each having phonetic symbols in which the first phonetic symbol of the misrecognized word is changed from the phonetic symbols of the word to be corrected (i.e., a search of words having one different first phonetic symbol) is carried out to present candidates for correction.

For example, when a correction is required for the keyword "lake" displayed as a result of speech recognition, this word is converted to the phonetic symbols "leik", and then a search of words "?eik" having a different first phonetic symbol is carried out from the dictionary DB.

Next, the searched words "fake", "cake", "rake", "shake", "bake" . . . are displayed as candidates for correction for the word "lake".

Next, the word selected from the candidates for corrections is confirmed as a keyword, and this keyword is combined with the other keywords that do not require correction to carry out a geographical point search. Then, the details of the selected geographical point are displayed, and a route search is carried out for the geographical point set as a destination.

2. Details of the Embodiment

Figures 1, 2:
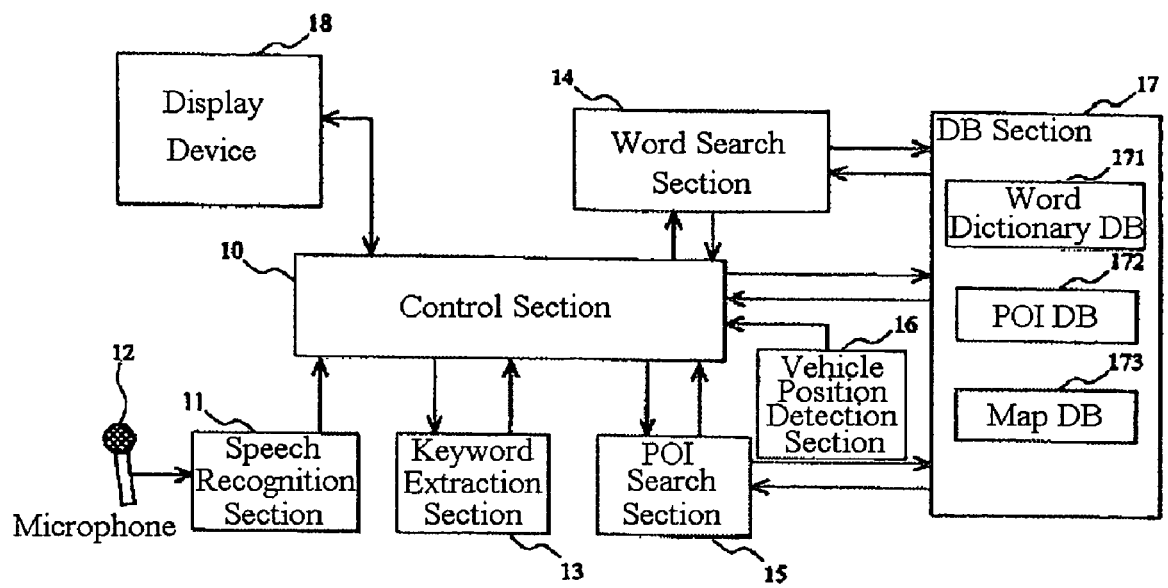
FIG. 1 is a block diagram which shows the overall structure of a navigation apparatus.
FIG. 2 shows a conceptual representation of the structure of the word dictionary DB.

FIG. 1 shows the structure of a navigation apparatus.

The navigation apparatus is equipped with a control section 10, a speech recognition section 11, a microphone 12, a keyword extraction section 13, a word search section 14, a POI search section 15, a vehicle position detection section 16, a DB section 17 and a display device 18.

The navigation apparatus is implemented by a computer system constructed from a CPU, a ROM, a RAM and the like. They function as the control section 10, the speech recognition section 11, the keyword extraction section 13, the word search section 14 and the POI search section 15 by the execution of various programs such as a geographical point search process program and the like stored in the RAM and the like.

The control section 10 controls each section related to various processes such as a map drawing process, a route search process, a route guidance process and the like, as well as a speech recognition correction process in the present embodiment.

The microphone 12 is connected to the speech recognition section 11, and the user's speech inputted from the microphone 12 is recognized and converted to text in the speech recognition section 11.

The speech recognition section 11 carries out speech recognition in which no limit is placed on the speech content, and is equipped with a speech recognition dictionary (not shown in the drawings) for this purpose. Further, the speech recognition dictionary may be stored separately in the DB section 17.

The keyword extraction section 13 extracts effective keywords for a POI search from the converted text resulting from the speech recognition carried out by the speech recognition section 11.

The extracted keywords are displayed on the display device 18 by the control section 10, and in this way the keyword extraction section 13, the control section 10 and the display device 18 function as word displaying means.

The word search section 14 searches the phonetic symbols of the keywords, and searches a word dictionary DB 171 for words (that is, proposed corrections) having one different phonetic symbol or one phonetic symbol added to or removed from the phonetic symbols of the keywords.

In this regard, the conversion of the keywords to phonetic symbols is carried out by searching complete matches in spelling from a word dictionary DB 171 constructed from spellings and phonetic symbols. Further, the search of words having one different phonetic symbol is carried out by partially matching phonetic symbols from the word dictionary DB 171.

Words (keywords) each having one different phonetic symbol searched by the word search section 14 are presented (displayed) on the display device 18 by the control section 10 as candidates for corrections, and in this way the word search section 14, the control section 10 and the display device 18 function as candidates presenting means.

The POI search section 15 searches geographical points from a POI DB (POI data base) 172 using the keywords confirmed by the results of the speech recognition and the correction process.

The POI search section 15 functions as geographical point searching means.

The vehicle position detection section 16 detects the current position (e.g., the absolute position given by longitude and latitude) of the vehicle. The detected current position is used in matching with road data and the like in route guidance, and is displayed as the current position of the vehicle on a map displayed on the display device 18, for example.

The vehicle position detection portion 16 uses a GPS (Global Positioning System) receiver which measures the position of a vehicle-using artificial satellites, a bearing sensor, a steering sensor, a distance sensor or the like, for example.

The DB section 17 is equipped with the word dictionary DB 171, the POI DB 172 and a map DB 173.

FIG. 2 is a conceptual representation of the structure of the word dictionary DB 171.

As shown in FIG. 2, the word dictionary DB 171 is constructed by a record formed from spellings and phonetic symbols of keywords related to geographical points.

The word dictionary DB 171 functions as storage means for storing keywords related to geographical points.

The POI DB 172 stores geographical point information (longitude and latitude), names and the phonetic symbols thereof, commentary information of the geographical points, addresses, telephone numbers (including cases where there is none), categories (including category codes), and keywords related to the geographical points.

The display device 18 can use various display devices such as a liquid crystal display device or the like to display speech recognition results, proposed corrections, travel routes and various information such as map information and the like in the present embodiment.

A touch panel is arranged on the surface of the display device 18, and by pressing (touching) a specific display region, the information content corresponding to such region is inputted.

Next, a description will be given for the geographical point search operation that includes correction of misrecognition of speech recognition in the navigation apparatus constructed as described above.

Figure 3:
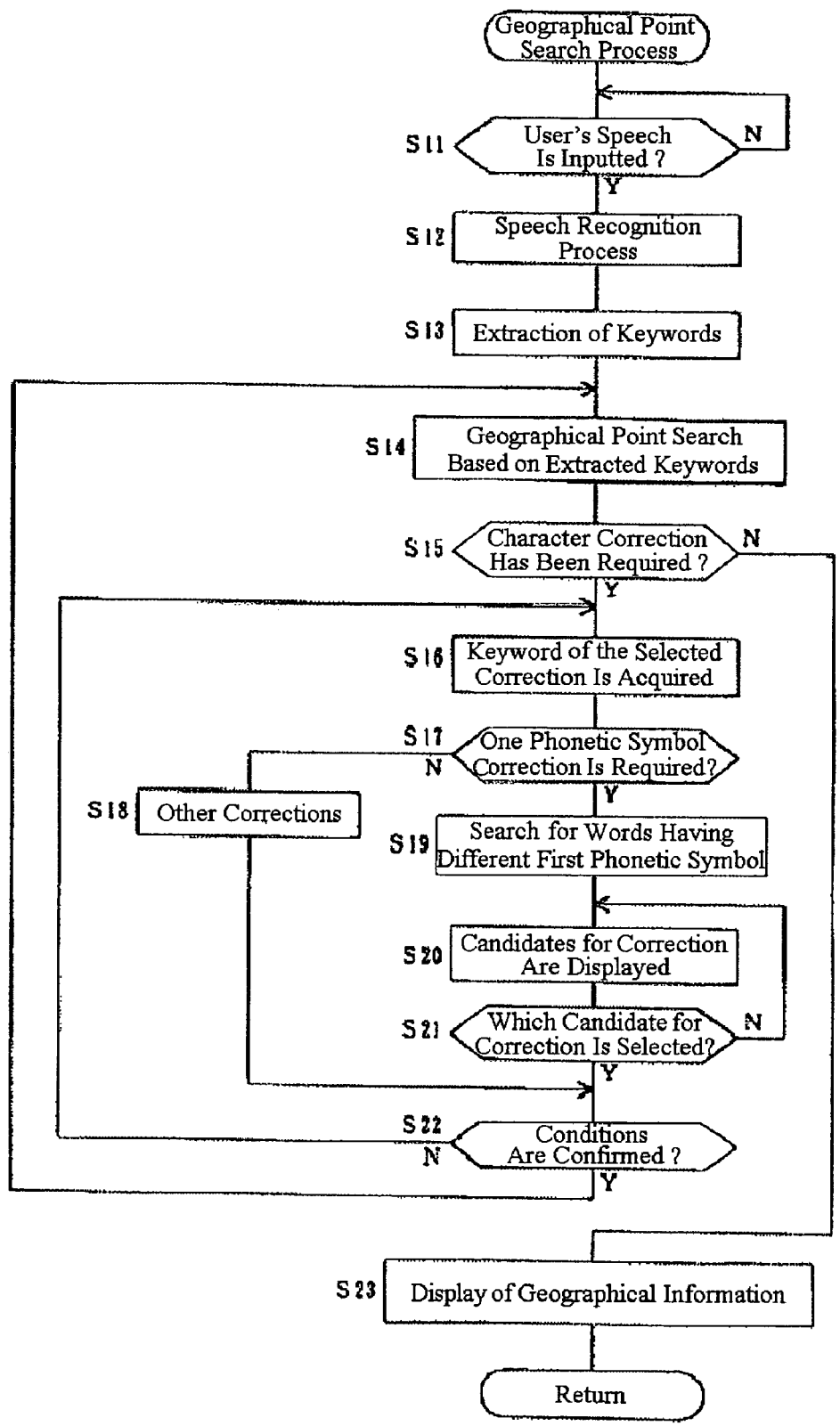
FIG. 3 is a flowchart of a geographical point search process.
Figure 4:
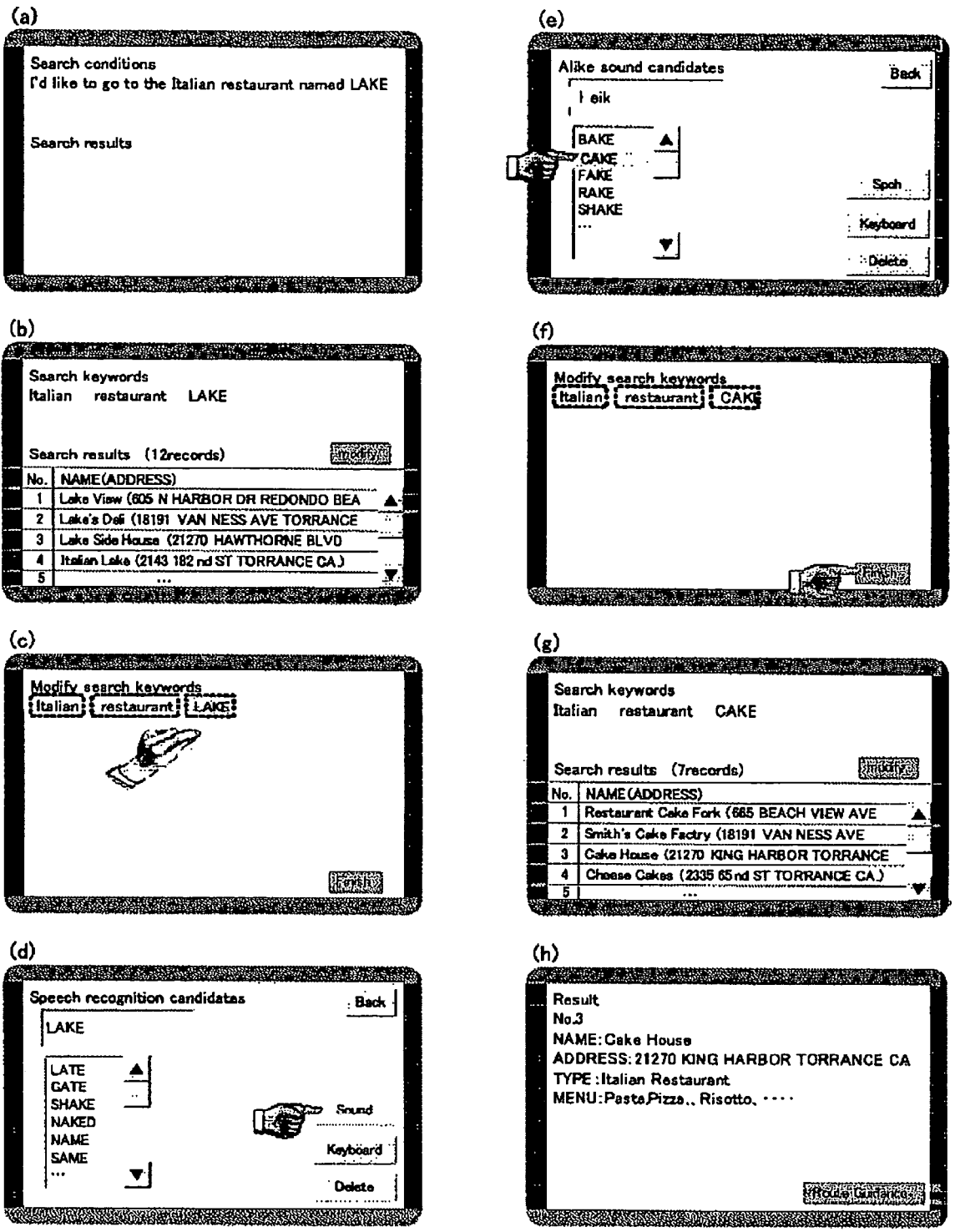
FIG. 4 shows transitions of the display screen for each process of the geographical point search process.

FIG. 3 is a flowchart of a geographical point search process, and FIG. 4 shows transitions of the display screen for each process of the geographical point search process.

The speech recognition section 11 of the navigation apparatus monitors whether or not a user's speech is inputted from the microphone 12 (Step 11).

The description given below is for the example case where the user inputs the phrase "I'd like to go to the Italian restaurant named LAKE." by speech from the microphone 12.

When the speech input of the user is detected (YES at Step 11), the speech recognition portion 11 recognizes the inputted speech using the speech recognition dictionary and converts this to text (Step 12).

The results of speech recognition are transmitted to the control section 10 and displayed as text on the display device 18 as shown in FIG. 4(*a*).

Next, the keyword extraction section 13 extracts effective keywords for a POI search from the converted text of the recognition results (Step 13).

In the present embodiment, the keywords forming the extraction objects are extracted from a keyword list provided in the keyword extraction section 13, but it is also possible to use the keywords in the POI DB 172.

As shown in FIG. 4(*b*), the extracted keywords are displayed for confirmation of the recognized speech and confirmation of the keywords used as search conditions.

Further, the geographical point search that depends on the extracted keywords is carried out by the POI search portion 15, and the names and addresses of searched geographical points are displayed in the form of a list (Step 14).

In this connection, regardless of whether or not there is a recognition or misrecognition, a geographical point search is carried out based on the extracted keywords. In the example shown in FIG. 4(*b*), because the word "Cake" inputted by speech by the user is misrecognized and extracted as the keyword "Lake", geographical points having a name that includes all the words "Lake", "Italian" and "restaurant" are displayed in the order closest to the current position.

Next, the control section 10 judges whether or not a character correction has been required (Step 15).

In the case where a character correction has been required by the user (YES at Step 15), the control section 10 switches to a correction mode (Step 16).

Namely, as shown in FIG. 4(*c*), the control section 10 changes the display screen to a conditional correction screen and displays keywords as possible corrections. Then, when the user selects a keyword to be corrected from the touch panel of the display screen, the keyword to be corrected is acquired (Step 16).

Further, as shown in FIG. 4(*d*), the control section 10 displays a selection screen for candidates for correction of the misrecognized word, in which the keyword "Lake" to be corrected is displayed in addition to a list of words having speech wave forms similar to that of the word "Lake" (Step 16).

The control section 10 monitors whether or not the user has selected one symbol correction ("Sound" button) in the correction screen (Step 17).

If a selection other than one symbol correction is made (N at Step 17), a correction corresponding to a selection button for one symbol addition, one symbol removal or multiple symbol additions or removals or the like is carried out (Step 18), and the process skips to Step 22.

On the other hand, in the case where there is one symbol correction (YES at Step 17), the control portion 10 changes the displayed keyword from the spelling "Lake" to the phonetic symbols "leik" as shown in FIG. 4(*e*).

Then, the word search section 14 searches words having a different first phonetic symbol from the phonetic symbols "leik" from the word dictionary DB 171 (Step 19). A list of the searched words each having a different first phonetic symbol is displayed by the control section 10 as candidates for corrections (Step 20).

Next, candidates for corrections in the form "?eik" are searched, and the searched results (candidates for corrections) are displayed. When the searched candidates for corrections are displayed as a list, such list may be arranged in alphabetical order, or the order of the list may be determined by considering the frequency or history of previous selections.

The control section 10 monitors which candidate for correction is selected by the user by a touch panel operation from the candidates for correction in the displayed list (Step 21).

When a candidate for correction is selected (Y at Step 21), the control section 10 returns to the conditional correction screen, and the keyword indicated as a misrecognition is changed to the selected candidate for correction. Then, as shown in FIG. 4(*f*), a "Finish" button is displayed on the screen, and the control section 10 monitors whether or not the "Finish" button (condition confirmation button) is selected, that is, whether or not the condition is confirmed (Step 22).

In the case where one of the keywords is selected by the touch panel while the condition confirmation button is not selected, that is, the condition is not confirmed (NO at Step 22), the control section 10 returns to Step 16, and correction of the selected keyword is carried out in the same manner as described above.

On the other hand, in the case where the condition confirmation button is selected (YES at Step 22), the process returns to Step 14, a geographical point search is carried out by the POI search section 15 based on the confirmed keywords, and the names and addresses of the searched geographical points are displayed in the form of a list (Step 14).

Then, the control section 10 judges whether or not another character correction has been required (Step 15).

In the screen of FIGS. 4(*b*) or 4(*g*), when one of the displayed searched geographical points is selected by speech input (e.g., "Number three" or "Three" or the like) or touch panel (NO at Step 15), the POI search section 15 reads out geographical point information of the selected geographical point from the POI DB 172. Then, the control section 10 displays the read out geographical information on the screen as shown in FIG. 4(*h*) (Step 23).

Further, the control section 10 displays geographical point information on the screen, sets the selected geographical point as the destination, and carries out a route search to the destination from the current position of the vehicle detected by the vehicle position detection section 16.

In the case where a geographical point search is carried out based on speech input by the navigation apparatus of the present embodiment described above, candidates for correction based on "one symbol correction" (YES at Step 17; Step 19, Step 20) for the misrecognized speech are searched and presented (displayed).

For this reason, because the displayed candidates for correction are limited to words having a different first phonetic symbol which has a high possibility of being the cause of misrecognition, the user can correct the misrecognized keyword by a simple operation.

Further, because it is possible to present candidates for correction by searching words having one different first phonetic symbol from the phonetic symbols of the misrecognized word, it is possible to reduce the process burden as compared to the conventional misrecognition correction processes.

A description was given above for one embodiment of the navigation apparatus of the present invention, but it should be noted that the present invention is not limited to the embodiment described above, and it is possible to make various changes in accordance with the scope of the invention as defined by the appended claims.

For example, in the embodiment described above, because the presence or absence of a character correction indication is confirmed (Step 15) before the indication of one symbol correction (Step 17), the number of process steps is increased. Therefore, when one of the search conditions "Italian", "Lake" . . . displayed on the search result screen of FIG. 4(*b*) is selected from the touch panel, supposition is made that one character correction is required, and then the process may immediately skip to Step 19 to display candidates for correction in the form of a list as shown in FIG. 4(*e*).

What is claimed is:

1. A navigation apparatus, comprising:
   storage means which stores keywords related to geographical points and their phonetic symbols;
   speech recognition means for recognizing the content of speech;
   word displaying means which displays words contained in the content of the recognized speech and matched with the keywords stored in the storage means;
   search means for searching, in the case where correction is required for one of the displayed words, words each having phonetic symbols in which only the first phonetic symbol thereof is different from the first phonetic symbol of the phonetic symbols of the word to be corrected;
   candidates presenting means for presenting the searched words as candidates for correction;
   result acquiring means for acquiring the word selected from the candidates for correction and words contained in the displayed words other than the selected word as a recognition result; and
   geographical point search means for carrying out a geographical point search based on the words of the recognition result.

2. The navigation apparatus as claimed in claim 1, wherein the word displaying means converts the content of the speech into text data, extracts keywords from the text data that can be used for a POI search, and then displays words that are matched with the keywords.

3. The navigation apparatus as claimed in claim 1, wherein the candidates presenting means displays the candidates for correction in alphabetical order.

4. The navigation apparatus as claimed in claim 1, wherein the candidates presenting means displays the candidates for correction in the form of a list determined by considering the frequency or history of previous selections.

* * * * *